United States Patent [19]

Charles

[11] Patent Number: 4,633,184

[45] Date of Patent: Dec. 30, 1986

[54] DEVICE FOR GENERATING A SIGNAL CORRESPONDING TO A VARIABLE MAGNITUDE ASSOCIATED WITH THE REACTIVE POWER OF AN ARC FURNACE IN ORDER TO CONTROL A REACTIVE POWER COMPENSATOR

[75] Inventor: Patrick Charles, Mareil sur Mauldre, France

[73] Assignee: CGEE Alsthom, Levallois Perret, France

[21] Appl. No.: 720,932

[22] Filed: Apr. 8, 1985

[30] Foreign Application Priority Data

Apr. 6, 1984 [FR] France .................................. 84 05506

[51] Int. Cl.$^4$ ............................................... H02J 3/18
[52] U.S. Cl. ...................................... 328/55; 333/167; 333/176; 333/181; 323/208
[58] Field of Search .................. 328/55, 167; 323/208, 323/213; 333/167, 168, 175, 176, 181

[56] References Cited

U.S. PATENT DOCUMENTS

| | | | |
|---|---|---|---|
| 2,730,667 | 1/1956 | Uhlmann | 333/181 |
| 3,267,359 | 8/1966 | Anderson | 323/213 |
| 3,571,767 | 3/1971 | Bush | 333/176 |
| 4,135,128 | 1/1979 | Kelly | 323/210 |
| 4,275,346 | 6/1981 | Kelley, Jr. | 323/210 |
| 4,496,859 | 1/1985 | Crooks | 333/176 |

FOREIGN PATENT DOCUMENTS 2457029 2/1984 France .

OTHER PUBLICATIONS

Brown Boveri Review, vol. 70, No. 9/10, Sep. Oct. 1983, pp. 330–340, "Compensation Systems for Industry", Baden (H) E, Wanner et al.

Primary Examiner—John S. Heyman
Attorney, Agent, or Firm—Sughrue, Mion, Zinn, Macpeak, and Seas

[57] ABSTRACT

A device generates a signal corresponding to a variable magnitude associated with the reactive power of an arc furnace, in order to control a reactive power compensator. It comprises a reactive power or voltage demodulator and a set of filters connected to the output of the demodulator. The set of filters comprises active bandstop filters having a bandwidth of ±F relative to frequencies of $2f_O$, $4f_O$ and $6f_O$ and narrowband active bandstop filters having a bandwidth of substantially ±2 Hz relative to frequencies of $f_O$ and $3f_O$. $f_O$ is the supply frequency and F is approximately $f_O/2$. The device further comprises a phase advance corrector circuit operative in the frequency band 0–F connected to the output of the set of filters.

4 Claims, 4 Drawing Figures

DEVICE FOR GENERATING A SIGNAL CORRESPONDING TO A VARIABLE MAGNITUDE ASSOCIATED WITH THE REACTIVE POWER OF AN ARC FURNACE IN ORDER TO CONTROL A REACTIVE POWER COMPENSATOR

BACKGROUND OF THE INVENTION

Field of the invention

Reactive power compensation regulation devices are needed in mains supplies subject to high current disturbances, for example in parts of mains supplies near arc furnaces. For this purpose it is necessary to use devices for measuring the power absorbed by the electrical circuit and if action is to be taken immediately to attenuate voltage fluctuations on the mains supply the measuring device must have a very fast response.

The frequency spectrum of the instanteous power of an arc furnace is represented by a continuous curve, the amplitude of which is high in a range of frequencies between 0 and approximately 25 Hz.

It is known that high-amplitude power fluctuations at these low frequencies cause a phenomenon known as "flicker" which is characterized by fluctuations in the brightness of incandescent lamps when their supply voltage is amplitude modulated.

The well-known thyristor controlled reactive power compensators are capable of significantly attenuating these phenomena, provided that there are available measured power or voltage signals giving a faithful representation of the fluctuations to be compensated in the frequency band considered, in this instance approximately 0 to 25 Hz, without significant phase shift in this frequency band or unwanted noise outside this frequency band.

Measuring the reactive power or voltage by known means enables only one of these objectives to be achieved at a time.

A known measuring system comprises a diode discriminator yielding a signal proportional to the absolute value of the voltage or a quadratic demodulator yielding a signal proportional to the square of the voltage or a reactive power demodulator followed by a lowpass filter.

The transfer function is of the lowpass type, the order depending on the required frequency range limit. It is possible to obtain a very rapid roll-off in the curve of the frequency spectrum from the cut-off frequency and the signals at the output of the device are of sufficient quality for comparative measurements but the phase differences between the various frequencies in the range considered at the output and input of the device are too high and as a result the output signal is not suitable for any form of fast-acting automatic control system.

An object of the present invention is to overcome this disadvantage.

SUMMARY OF THE INVENTION

The present invention consists in a device for generating a signal corresponding to a variable magnitude associated with the reactive power of an arc furnace in order to control a reactive power compensator, comprising a reactive power or voltage demodulator, a set of filters connected to the output of said demodulator and comprising active bandstop filters having a bandwidth $\pm F$ relative to frequencies of $2f_0$, $4f_0$ and $6f_0$ and narrowband active bandstop filters having a bandwidth of substantially $\pm 2$ Hz relative to frequencies of $f_0$ and $3f_0$, where $f_0$ is the supply frequency and F is approximately $f_0/2$, and a phase advance corrector circuit operative in the frequency band 0–F connected to the output of said set of filters.

In a preferred embodiment, said set of filters further comprises an active lowpass filter with a cut-off frequency of $6f_0$.

Said set of filters advantageously further comprises a narrowband active bandstop filter with a bandwidth of substantially $\pm 2$ Hz relative to a frequency of $5f_0$.

In accordance with another characteristic of the invention, said corrector circuit comprises a second order active highpass filter with a cut-off frequency of substantially $2F/3$ connected to the output of said set of filters, and the device further comprises a summing circuit having one input connected to the output of said set of filters and another input connected to the output of said highpass filter.

Other objects and advantages will appear from the following description of an example of the invention, when considered in connection with the accompanying drawing, and the novel features will be particularly pointed out in the appended claims.

DESCRIPTION OF THE PREFERRED EMBODIMENT

In the following description, the frequency $f_0$ of the supply voltage to the arc furnace is taken as 50 Hz and the frequency band 0–F to be protected against the frequency spectrum of the furnace power is $0-F=25$ Hz. This is in order to obtain a control signal for a thyristor controlled power compensator, retaining dependable modulation in this range $0-F$ of the average power signal represented in FIG. 2 by the amplitude A of the curve at the frequency $F=0$.

Figure 2:
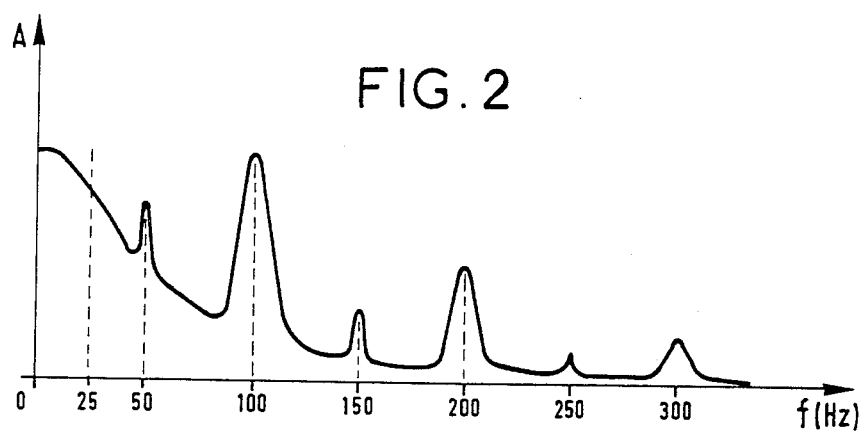
FIG. 2 shows the power frequency spectrum of an arc furnace.

Referring to FIG. 2, it is seen that the spectrum of an arc furnace comprises high-energy signals centered on frequencies which are multiples of the frequency $f_0$ of the mains supply, in this instance, for a 50 Hz supply: 50, 100, 150, 200, 250 and 300 Hz, with decreasing amplitudes.

Figure 1:
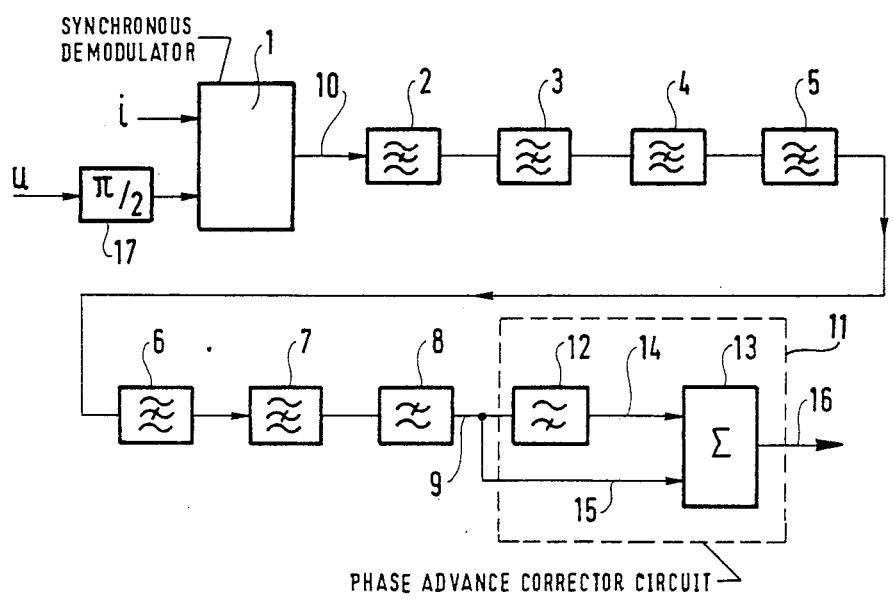
FIG. 1 is a block schematic of the device is accordance with the invention.

The device of FIG. 1 therefore comprises a synchronous demodulator 1 receiving on one of its inputs the instantaneous current i absorbed by the furnace. The voltage u applied to the furnace is applied to a circuit 17 which applies a phase-shift of $\pi/2$ and the output of which is connected to a separate input of the demodulator 1. There is thus obtained at the output of the demodulator 1 a signal proportional to the reactive power absorbed by the furnace, the frequency spectrum of which is shown in FIG. 2, which is fed to a set of bandstop filters 2 to 7 centered on the above frequencies up to a rank sufficiently high for the residual signals to be low, followed by a lowpass filter 8.

The filters 3, 5 and 7 are active bandstop filters respectively centered on the even harmonics $2f_0$, $4f_0$ and $6f_0$, that is to say 100, 200 and 300 Hz, and with a bandwidth of $\pm F$, that is to say in this instance $\pm 25$ Hz.

The reactive power compensator and its control circuit are particularly sensitive to noise contained in the control signal. To a good approximation it may be considered that modulation signals of frequency F relative to the even harmonics produce the same effect as signals at frequency F. Thus as it is required to obtain dependable modulation in the frequency band from 0 to F, in this instance 0 to 25 Hz, it is necessary to eliminate all signals in a frequency band $\pm 25$ Hz relative to the even harmonics.

Figure 3:
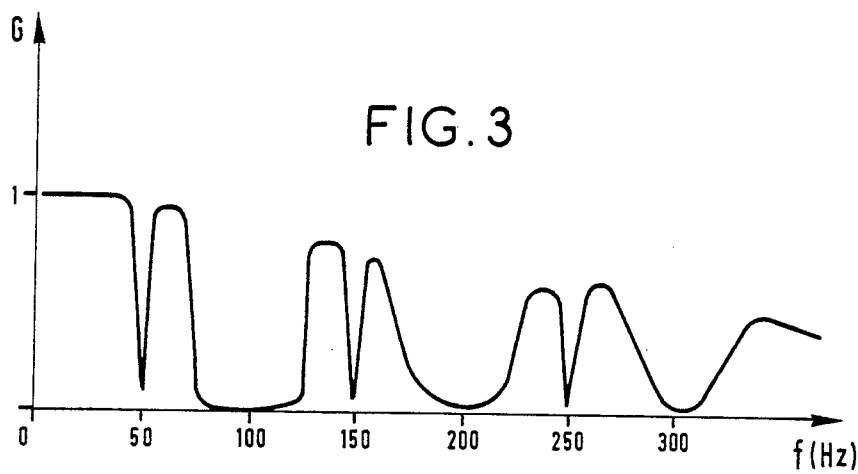
FIG. 3 is a graph of gain as a function of frequency for the set of filters in FIG. 1.

The response in a frequency band of $\pm 25$ Hz relative to the even harmonics 100, 200 and 300 Hz is shown in FIG. 3, plotting the gain of the set of filters as a function of frequency.

In addition to cutting off the even harmonics over a wide frequency band of $\pm F$, it is also necessary, in order to be able to modulate the compensator with a high modulation level in the frequency band from 0 to 25 Hz, to reduce the amplitude of the unnecessary signals, even if they do not produce any unwanted modulation in the wanted frequency band. Thus the filters 2, 4 and 6 are respectively active bandstop filters centered on the odd harmonics: 50, 150 and 250 Hz, with a narrow bandwidth in the order of $\pm 2$ to 3 Hz.

Finally, the filter 8 is an active lowpass filter with a cut-off frequency of 300 Hz.

The filters 6 and 8 are not strictly necessary, but their presence improves the system.

FIG. 3 shows the graph of the gain as a function of frequency, allowing for the presence of the seven filters 2 to 8.

However, the above filters produce a negative phase shift at the output 9 of the filter 8 relative to the signal input 10 at the input of the filter 2. This phase shift is shown on the graph in FIG. 4. In this figure, the phase shift is plotted in degrees as a function of the frequency f in Hertz.

A phase shift of this kind is compensated by a phase advance corrector circuit 11 comprising an active second order highpass filter 12 connected to the output 9 of the filter 8 and a summing circuit 13 which receives on a first input 14 the output signal from the filter 12 and has a second input 15 connected to the output 9 of the filter 8. The cut-off frequency of the highpass filter 12 is approximately $2F/3$, in this instance 15 Hz.

Figure 4:
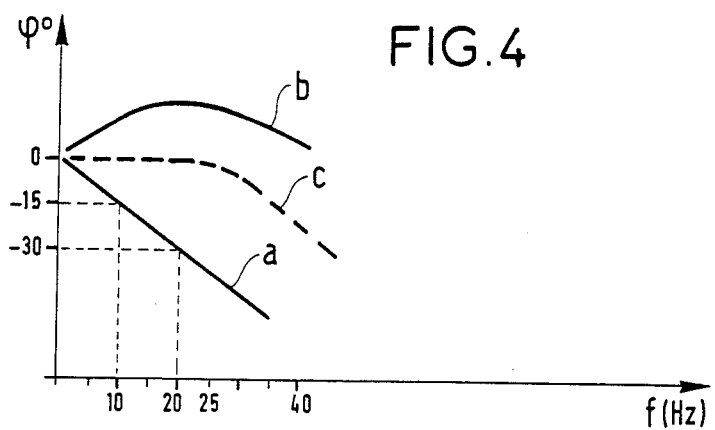
FIG. 4 is a graph showing the phase difference in degrees as a function of the frequency of the output signal, relative to the input signal, at three different device operating levels.

Curve b in FIG. 4 shows the phase shift inherent to the corrector 11 and curve c gives the phase of the output 16 of the set of filters relative to the input 10.

The device in accordance with the invention yields the best performance known.

The synchronous demodulator 1 may naturally be replaced by a quadratic demodulator yielding the square of the voltage or by an idealized diode discriminator yielding the absolute value of the voltage, or by any circuit the output of which is related to the power absorbed by the furnace. In this case the $\pi/2$ phase shifter circuit 17 is not required, of course.

The device may be implemented in digital form.

It will be understood that various changes in the details, materials and arrangements of parts which have been herein described and illustrated in order to explain the nature of the invention may be made by those skilled in the art within the principle and scope of the invention as expressed in the appended claims.

There is claimed:

1. Device for generating a signal corresponding to a variable magnitude associated with the reactive power of an arc furnace in order to control a reactive power compensator, comprising a reactive power or voltage demodulator, a set of filters connected in series to the output of said demodulator and comprising at least three active bandstop filters having a bandwidth $\pm F$ relative to frequencies of $2f_0$, $4f_0$ and $6f_0$ and at least two narrowband active bandstop filters having a bandwidth of substantially $\pm 2$ Hz relative to frequencies of $f_0$ and $3f_0$, where $f_0$ is the supply frequency and F is approximately $f_0/2$, and a phase advance corrector circuit operative in the frequency band 0–F connected to the output of said set of filters.

2. Device according to 1, wherein said set of filters further comprises a sixth active lowpass filter with a cut-off frequency of $6f_0$.

3. Device according to 1, wherein said set of filters further comprises a seventh narrowband active bandstop filter with a bandwidth of substantially $\pm 2$ Hz relative to a frequency of $5f_0$.

4. Device according to 1, wherein said corrector circuit comprises a second order active highpass filter with a cut-off frequency of substantially $2F/3$ connected to the output of said set of filters, and further comprising a summing circuit having one input connected to the output of said set of filters and another input connected to the output of said highpass filter.

* * * * *